United States Patent [19]

Baude et al.

[11] Patent Number: 5,530,491
[45] Date of Patent: Jun. 25, 1996

[54] SIMULTANEOUS VISION OPHTHALMIC LENS FOR CORRECTING PRESBYOPIA AND PAIR OF OPHTHALMIC LENSES OF THIS KIND FOR THE SAME WEARER

[75] Inventors: Dominique Baude, Saint-Ouen; Pierre Monteil, Paris, both of France

[73] Assignee: Essilor International Cie Generale d'Optique, Charenton le Pont, France

[21] Appl. No.: 186,842

[22] Filed: Jan. 27, 1994

[30] Foreign Application Priority Data

Feb. 18, 1993 [FR] France .................. 93 01831

[51] Int. Cl.$^6$ ............................................ G02C 7/06
[52] U.S. Cl. ................................. 351/169; 351/168
[58] Field of Search ................................. 351/168, 169, 351/170, 171, 172

[56] References Cited

U.S. PATENT DOCUMENTS

| | | | |
|---|---|---|---|
| 4,784,482 | 11/1988 | Guilino | 351/167 |
| 4,976,534 | 12/1990 | Miege | 351/160 |
| 5,002,382 | 3/1991 | Seidner | 351/160 |
| 5,139,325 | 8/1992 | Oksman | 351/160 |

FOREIGN PATENT DOCUMENTS

| | | |
|---|---|---|
| 0132955 | 2/1985 | European Pat. Off. . |
| 0138394 | 4/1985 | European Pat. Off. . |
| 0307876 | 3/1989 | European Pat. Off. . |
| 0453136 | 10/1991 | European Pat. Off. . |
| 2139375 | 11/1984 | United Kingdom . |

*Primary Examiner*—Scott J. Sugarman
*Attorney, Agent, or Firm*—Young & Thompson

[57] ABSTRACT

To define a far vision area and a near vision area in a simultaneous vision ophthalmic lens for correcting presbyopia, the curve representing the proximity as a function of the distance from the axis lies within an area between a lower envelope curve and an upper envelope curve with associated specific polynomial equations in which the coefficients depend on the proximity addition corresponding to the degree of presbyopia of the wearer. Either the far vision area or the near vision area is strengthened relative to the other, the corresponding surface areas $S_{VL}$, $S_{VP}$ being related as follows:

for strengthened near vision:

$$1.8 \leq S_{VL}/S_{VP} \leq 3.6$$

and for strengthened far vision:

$$4.75 \leq S_{VL}/S_{VP}$$

15 Claims, 3 Drawing Sheets

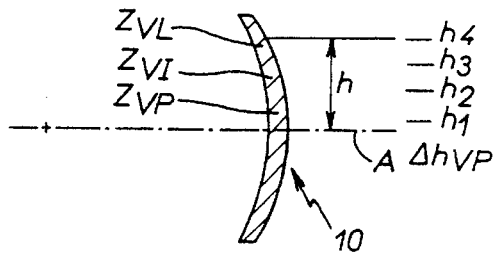
FIG.1
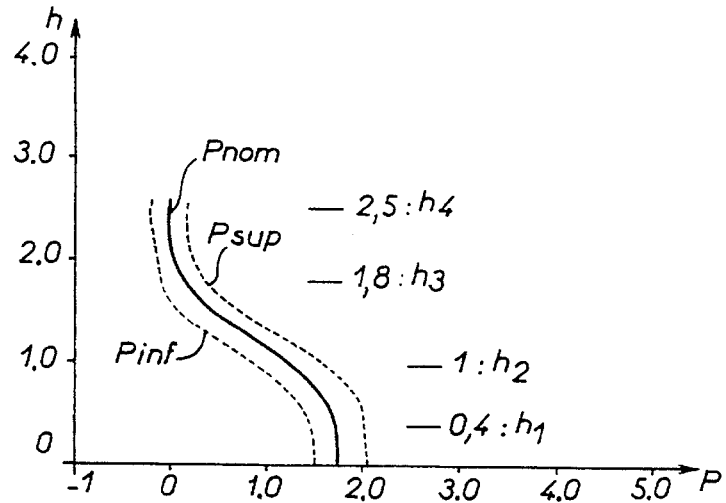
FIG.2A ($A_{DD}=1,5D$)
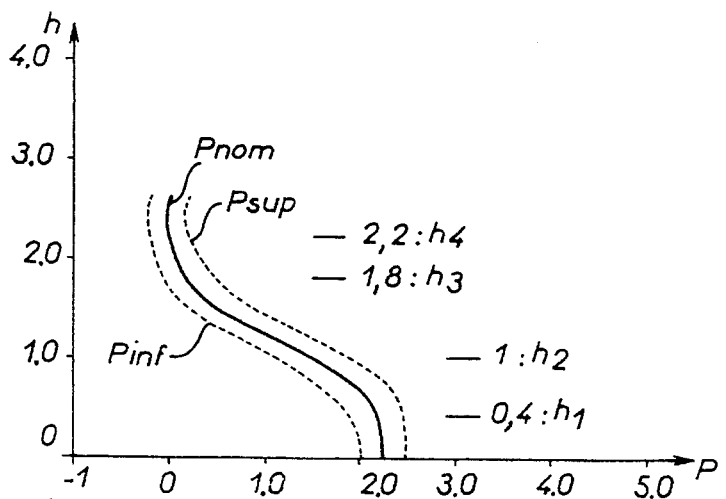
FIG.2B ($A_{DD}=2D$)
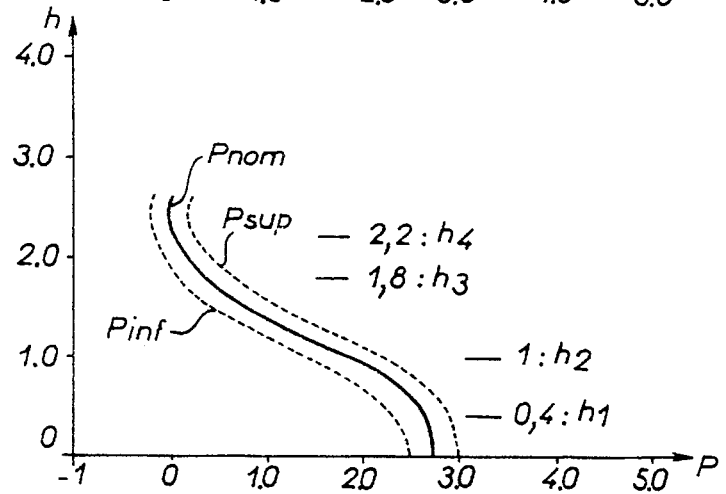
FIG.2C ($A_{DD}=2,5D$)

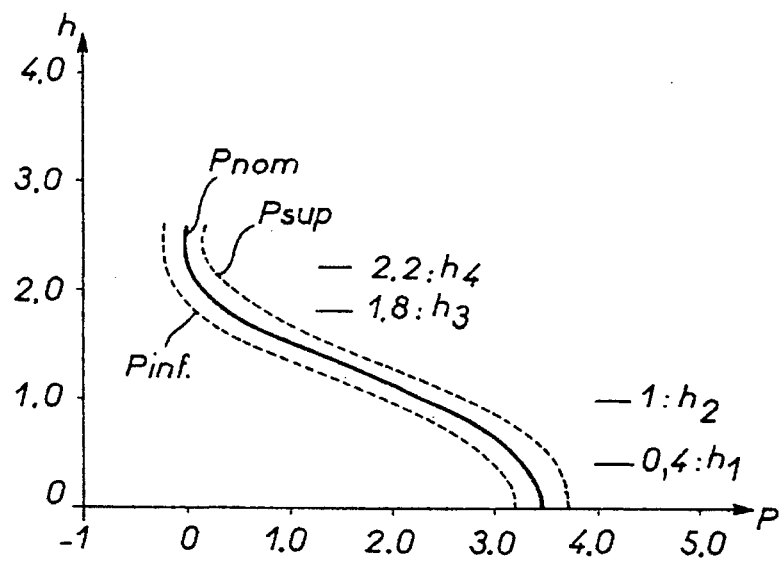
FIG. 2D ($A_{DD} = 3D$)
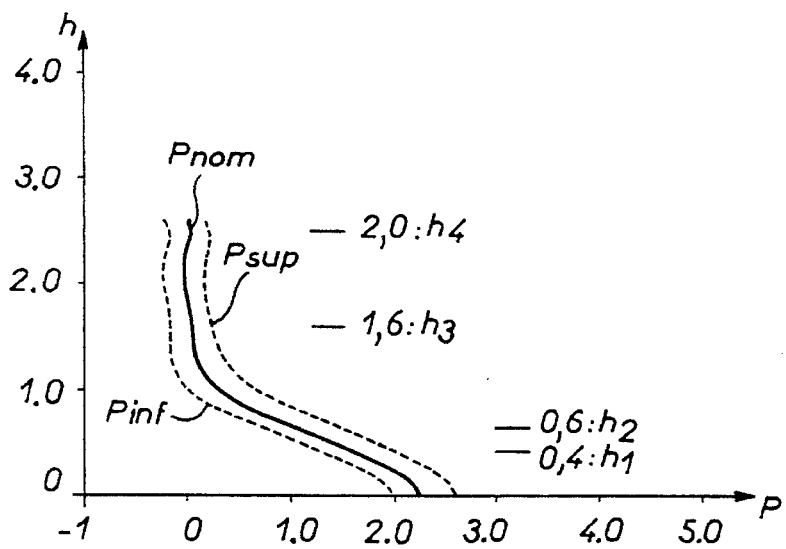
FIG. 3A ($A_{DD} = 1,5D$)
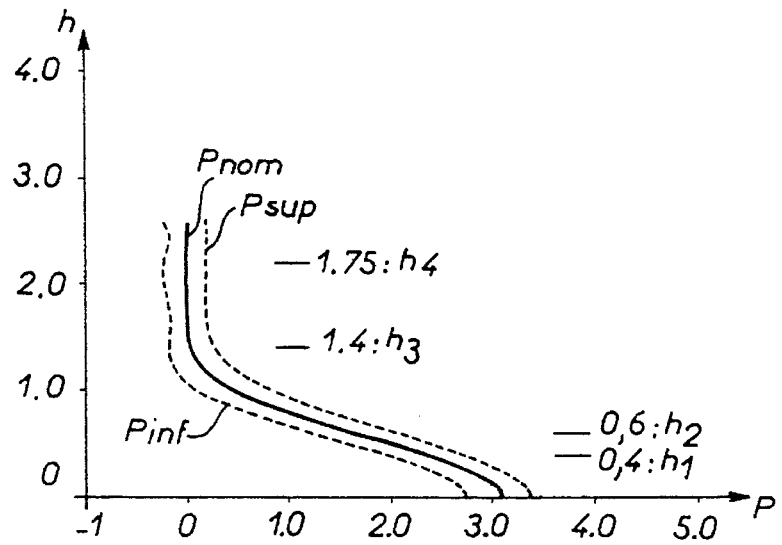
FIG. 3B ($A_{DD} = 2D$)

SIMULTANEOUS VISION OPHTHALMIC LENS FOR CORRECTING PRESBYOPIA AND PAIR OF OPHTHALMIC LENSES OF THIS KIND FOR THE SAME WEARER

BACKGROUND OF THE INVENTION

Description of the Prior Art

French patent application No 89 01417 (publication No 2 642 854) describes a simultaneous vision ophthalmic lens for which the curve representing the proximity as a function of the distance from the axis lies within an area between a lower envelope curve and an upper envelope curve associated with specific polynomial equations defining two distinct vision areas, a far vision area and a near vision area, with one or more intermediate vision areas between and continuous with them.

This ophthalmic lens can be implemented as a contact lens or an intraocular implant or an intracorneal lens and in practise has at least on aspherical side or incorporates an index gradient. It is more particularly intended for correcting presbyopia.

The parameters of the polynomial equations for the envelope curves of the curve representing its proximity depend closely on the proximity addition respective to the degree of presbyopia to be corrected.

In this French patent it is preferred that neither of the two far and near vision areas be larger than the other.

To this end the surface area $S_{VL}$ of the far vision area and the surface area $S_{VP}$ of the near vision area are related as follows:

$$S_{VL}/S_{VP} \geq 3 \qquad (I)$$

This is satisfactory in most cases.

In some cases, however, near vision or far vision performance is found to be insufficient.

SUMMARY OF THE INVENTION

In one aspect the present invention consists in a simultaneous vision ophthalmic lens of the kind in which to define two distinct vision areas, one for far vision and the other for near vision, the curve representative of the proximity as a function of the distance from the axis lies within an area between a lower envelope curve and an upper envelope curve associated with specific polynomial equations, this ophthalmic lens being generally characterised in that either the far vision area or the near vision area is strengthened relative to the other, the respective surface areas $S_{VL}$, $S_{VP}$ being related as follows:

for strengthened near vision:

$$1.8 \leq S_{VL}/S_{VP} \leq 3.6 \qquad (II)$$

and for strengthened far vision:

$$4.75 \leq S_{VL}/S_{VP} \qquad (III)$$

In another aspect the invention consists in any matched pair of ophthalmic lenses for the same wearer, one for correcting the vision of the left eye and the other for correcting the vision of the right eye, in at least one of which lenses the near vision area or the far vision area is strengthened in this way relative to the other.

The ophthalmic lens with a strengthened vision area could be matched with a standard ophthalmic lens, i.e. an ophthalmic lens in which the near and far vision areas are equivalent.

Alternatively, it could be matched with an ophthalmic lens which also has a strengthened vision area, either the same vision area as itself or the other vision area.

This has the advantage of providing the best possible solution to the greatest number of problems.

Extending or reducing the near vision area, which can result in a non-unity ratio of surface areas between it and the far vision area, is already known, for example from published European patent application No 0 138 394.

However, apart from the fact that the surface area of thee near vision area is preferably equal to substantially half the surface area of the pupil of the wearer, this European patent application concerns a bifocal lens, i.e. a lens which has no intermediate vision area between its near and far vision areas.

This is not the case in the ophthalmic lens in accordance with the invention.

An asymmetrical arrangement of the near and far vision areas in the two ophthalmic lens intended for the same wearer has also been proposed, for example in published European patent application No 0 453 136.

However, this European patent application concerns a diffraction grating lens in which there is again no intermediate vision area.

The objects, features and advantages of the invention emerge from the following description given by way of example with reference to the accompanying diagrammatic drawings.

BRIEF DESCRIPTION OF THE DRAWINGS

FIG. 1 is a view in axial cross-section of an ophthalmic lens according to the invention.

FIGS. 2A, 2B, 2C, 2D are diagrams representing the proximity of this ophthalmic lens for respective different values of the addition when its near vision area is strengthened.

FIGS. 3A, 3B, 3C, 3D are diagrams respectively analogous to those of FIGS. 2A, 2B, 2C, 2D for the situation in which the far vision area of the ophthalmic lens is strengthened.

DESCRIPTION OF THE PREFERRED EMBODIMENT

Figure 3C:
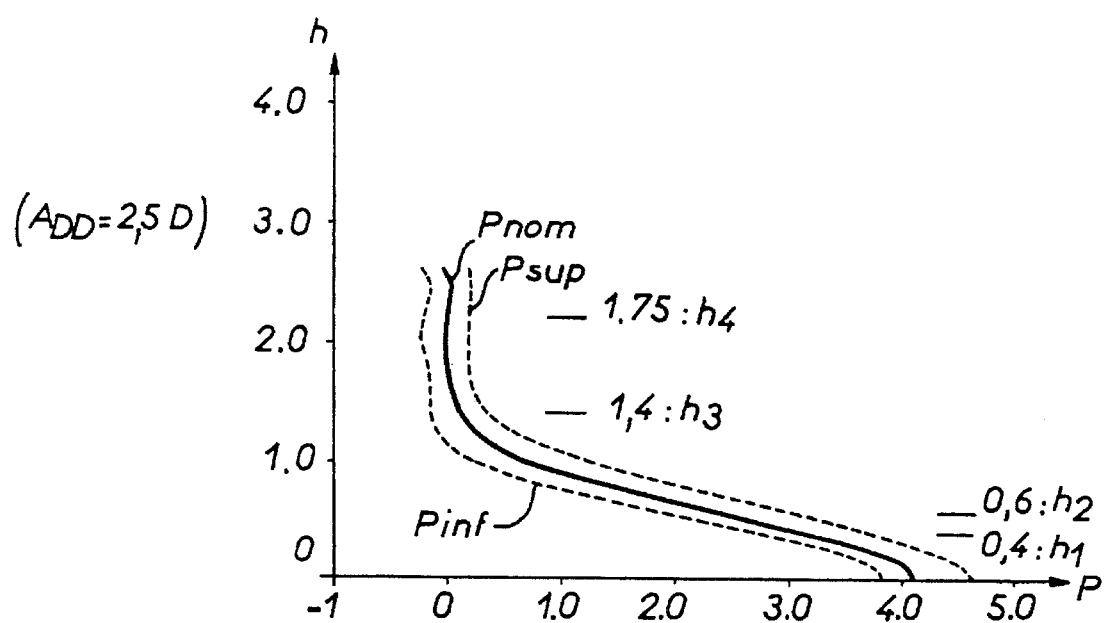
Figure 3D:
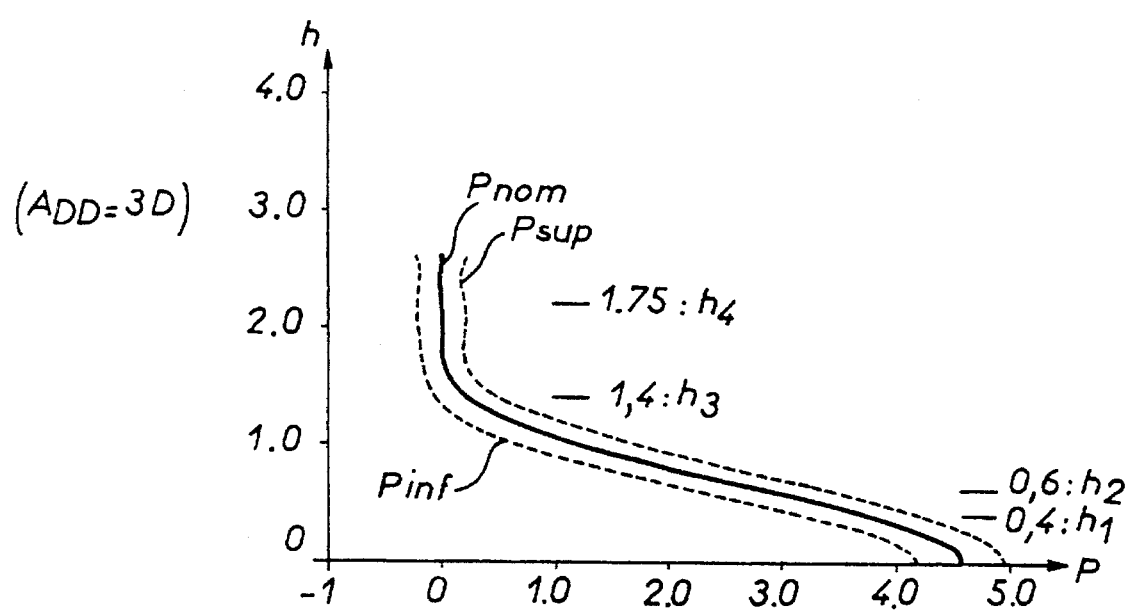

As shown in the diagrams of FIGS. 2 and 3 and as described in French patent application No 2 642 854, the curve representing the proximity P of the lens 10 in accordance with the invention as a function of the far h from the axis A lies within an area between a lower envelope curve $P_{inf}$ and an upper envelope curve $P_{sup}$ associated with specific polynomial equations whose coefficients depend on the addition $A_{DD}$ respective to the degree of presbyopia to be corrected.

It is thus possible to define in the lens two separate annular vision areas on respective opposite sides of an intermediate vision area $Z_{VI}$, namely a far vision area $Z_{VL}$ and a near vision area $Z_{VP}$.

The far vision area $Z_{VL}$ is preferably adjacent the peripheral part of the ophthalmic lens 10 while the near vision area $Z_{VP}$ is preferably near its axis A.

The opposite arrangement may be adopted if desired, however.

Let $h_1$ and $h_2$ denote the values of the distance h between which the near vision area $Z_{VP}$ lies and $h_3$ and $h_4$ denote the values of this distance h between which the far vision area $Z_{VL}$ lies, the intermediate vision area $Z_{VI}$ lying by definition between these areas and therefore between the values $h_2$ and $h_3$ of the distance h.

For practical reasons the value $h_4$ of the distance h is a maximal value related to the radius of the human pupil for a person suffering from presbyopia.

This radius is known to decrease with age, for the same luminance conditions.

The maximal value $h_4$ of the distance h is therefore related to the addition $A_{DD}$ required by the wearer.

As shown in the diagrams of FIGS. 2 and 3, for example, it is equal to 2.5 mm for a proximity addition equal to 1.5 diopters (D) and is equal to 2.2 mm for a proximity addition $A_{DD}$ greater than 1.5 diopters (D).

Also for practical reasons, the value $h_1$ of the distance h delimiting the near vision area $Z_{VP}$ near the axis A is a minimal value.

Let $S_{VP}$ denote the surface area of the near vision area $Z_{VP}$ in which near vision images are formed correctly and $S_{VL}$ denote the surface area of the far vision area $Z_{VL}$ in which far vision images are formed correctly.

$$S_{VL} = K(h_4^2 - h_3^2)$$
$$S_{VP} = K(h_2^2 - h_1^2)$$

and thus: $\dfrac{S_{VL}}{S_{VP}} = \dfrac{h_4^2 - h_3^2}{h_2^2 - h_1^2}$

In accordance with the invention, the far vision area $Z_{VL}$ or the near vision area $Z_{VP}$ is strengthened relative to the other area, the respective surface areas $S_{VL}$, $S_{VP}$ being related as follows:

for strengthened near vision:

$$1.8 \leq S_{VL}/S_{VP} \; 3.6 \quad \text{(II)}$$

and for strengthened far vision:

$$4.75 \leq S_{VL}/S_{VP} \quad \text{(III)}$$

This is achieved by an appropriate choice of the coefficients of the polynomial equations for the lower envelope curve $P_{inf}$ and the upper envelope curve $P_{sup}$.

Particularly favourable results have been obtained when the lower envelope curve $P_{inf}$ and the upper envelope curve $P_{sup}$ satisfy the following polynomial equations:

$$P_{inf} = f(h) = \sum_{i=0}^{i=6} A_i' h^{2i} + P_{VL}$$

$$P_{sup} = f(h) = \sum_{i=0}^{i=6} A_i'' h^{2i} + P_{VL}$$

in which $P_{VL}$ is the proximity needed for far vision.

Particularly favorable results are obtained with substantially the values listed below for the coefficients $A_i'$ and $A_i''$, here in the case of strengthening of the near vision area $Z_{VP}$ relative to the far vision area $Z_{VL}$, for example:

for $A_{DD} = 1.5$ D:

$A'_0 = 1.50491$
$A'_1 = -1.38224 \times 10^{-1}$
$A'_2 = -8.56090 \times 10^{-1}$
$A'_3 = 4.77223 \times 10^{-1}$
$A'_4 = -1.07980 \times 10^{-1}$
$A'_5 = 1.12726 \times 10^{-2}$
$A'_6 = -4.47482 \times 10^{-4}$ $A''_0 = 2.04007$
$A''_1 = 4.87097 \times 10^{-2}$
$A''_2 = -7.56137 \times 10^{-1}$
$A''_3 = 3.28870 \times 10^{-1}$
$A''_4 = -6.18287 \times 10^{-2}$
$A''_5 = 5.58413 \times 10^{-3}$
$A''_6 = -1.98243 \times 10^{-4}$ for $A_{DD} = 2$ D:

$A'_0 = 2.02242$
$A'_1 = -6.40349 \times 10^{-1}$
$A'_2 = -5.33753 \times 10^{-1}$
$A'_3 = 3.45296 \times 10^{-1}$
$A'_4 = -7.89597 \times 10^{-2}$
$A'_5 = 8.16828 \times 10^{-3}$
$A'_6 = -3.20478 \times 10^{-4}$ $A''_0 = 2.48815$
$A''_1 = 1.68157 \times 10^{-1}$
$A''_2 = -1.19876$
$A''_3 = 5.83726 \times 10^{-1}$
$A''_4 = -1.24851 \times 10^{-1}$
$A''_5 = 1.27178 \times 10^{-2}$
$A''_6 = -5.00502 \times 10^{-4}$ for $A_{DD} = 2.5$ D:

$A'_0 = 2.48274$
$A'_1 = -8.68865 \times 10^{-1}$
$A'_2 = -3.88790 \times 10^{-1}$
$A'_3 = 2.79778 \times 10^{-1}$
$A'_4 = -6.48836 \times 10^{-2}$
$A'_5 = 6.77817 \times 10^{-3}$
$A'_6 = -2.68852 \times 10^{-4}$ $A''_0 = 2.97168$
$A''_1 = -2.69412 \times 10^{-1}$
$A''_2 = -8.19247 \times 10^{-1}$
$A''_3 = 4.23097 \times 10^{-1}$
$A''_4 = -9.28940 \times 10^{-2}$
$A''_5 = 9.73358 \times 10^{-3}$
$A''_6 = -3.94207 \times 10^{-4}$ for $A_{DD} = 3$ D:

$A'_0 = 3.20707$
$A'_1 = -1.13298$
$A'_2 = -3.09307 \times 10^{-1}$
$A'_3 = 2.18484 \times 10^{-1}$
$A'_4 = -4.43817 \times 10^{-2}$
$A'_5 = 4.04925 \times 10^{-3}$
$A'_6 = -1.42370 \times 10^{-4}$ $A''_0 = 3.72727$
$A''_1 = -5.24234 \times 10^{-1}$
$A''_2 = -7.92418 \times 10^{-1}$
$A''_3 = 4.14478 \times 10^{-1}$
$A''_4 = -8.98178 \times 10^{-2}$
$A''_5 = 9.32974 \times 10^{-3}$
$A''_6 = -3.76612 \times 10^{-4}$ In the FIG. 2A, 2B, 2C and 2D diagrams the proximity P in diopters (D) is plotted on the abscissa axis and the distance h in mm is plotted on the ordinate axis. The respective envelope curves $P_{inf}$, $P_{sup}$ for a distant vision proximity value $P_{VL}$ equal to zero and an addition $A_{DD}$ equal to 1.5 D for FIG. 2A, equal to 2D for FIG. 2B, equal to 2.5 D for FIG. 2C and equal to 3 D for FIG. 2D are shown in dashed line.

The envelope curves $P_{inf}$ and $P_{sup}$ for other, positive or negative values of the far vision proximity $P_{VL}$ are deduced from those reproduced here by simple translation.

The diagrams also show in full line, between the envelope curves $P_{inf}$ and $P_{sup}$, a curve $P_{nom}$ representing a nominal proximity which is particularly satisfactory.

This curve $P_{nom}$ satisfies the equation:

$$P_{nom} = f(h) = \sum_{i=0}^{i=6} A_i h^{2i} + P_{VL}$$

with substantially the following values for the numerical coefficients $A_i$, and the conditions otherwise as previously:

for $A_{DD} = 1.5$ D:
$A_0 = 1.74537$
$A_1 = -1.41485 \times 10^{-2}$
$A_2 = -7.74395 \times 10^{-1}$
$A_3 = 3.78836 \times 10^{-1}$
$A_4 = -7.92805 \times 10^{-2}$
$A_5 = 7.88011 \times 10^{-3}$
$A_6 = -3.03496 \times 10^{-4}$ for $A_{DD} = 2$ D:
$A_0 = 2.25360$
$A_1 = -9.83461 \times 10^{-2}$
$A_2 = -1.05467$
$A_3 = 5.47912 \times 10^{-1}$
$A_4 = -1.18670 \times 10^{-1}$
$A_5 = 1.20372 \times 10^{-2}$ $A_6=-4.68919\times10^{-4}$
for $A_{DD}=2.5$ D:
$A_0=2.72749$
$A_1=-2.39063\times10^{-1}$
$A_2=-9.80544\times10^{-1}$
$A_3=5.14985\times10^{-1}$
$A_4=-1.13158\times10^{-1}$
$A_5=1.17328\times10^{-2}$
$A_6=-4.68365\times10^{-4}$
for $A_{DD}=3$ D:
$A_0=3.47334$
$A_1=-9.73082\times10^{-1}$
$A_2=-2.97809\times10^{-1}$
$A_3=1.70028\times10^{-1}$
$A_4=-3.05735\times10^{-2}$
$A_5=2.58076\times10^{-3}$
$A_6=-8.78906\times10^{-5}$ Note that for each value of the addition $A_{DD}$ the envelope curves $P_{inf}$ and $P_{sup}$ are generally similar to the respective nominal curve $P_{nom}$, at least in their central region.

As explained in French patent application No 2 642 854, the person skilled in the art can use the proximity curves to determine either the front and rear surfaces of the ophthalmic lens 10 or its index gradient, in order for it to satisfy a proximity curve of this kind.

The rear side of the ophthalmic lens 10 in accordance with the invention is preferably a spherical surface, only the front side being shaped to obtain the required proximity curve.

This surface is then obviously an aspherical surface.

Alternatively, any combination of spherical or aspherical surfaces or of index gradients giving a proximity curve fitting between the indicated envelope curves $P_{inf}$ and $P_{sup}$ can be used.

In accordance with the invention, to strengthen the far vision area $Z_{VL}$ relative to the near vision area $Z_{VP}$, the coefficients $A'_i$ and $A''_i$ of the polynomial equations for the envelope curves $P_{inf}$ and $P_{sup}$ have substantially the following values:

for $A_{DD} = 1.5$ D:

$A'_0 = 1.97385$          $A''_0 = 2.61695$
$A'_1 = -4.02882$         $A''_1 = -3.55654$
$A'_2 = 2.96745$          $A''_2 = 2.28086$
$A'_3 = -1.08765$         $A''_3 = -7.81238 \times 10^{-1}$
$A'_4 = 2.08906 \times 10^{-1}$    $A''_4 = 1.46046 \times 10^{-1}$
$A'_5 = -2.00552 \times 10^{-2}$   $A''_5 = -1.39278 \times 10^{-2}$
$A'_6 = 7.57585 \times 10^{-4}$    $A''_6 = 5.27592 \times 10^{-4}$ for $A_{DD} = 2$ D:

$A'_0 = 2.75706$          $A''_0 = 3.39285$
$A'_1 = -5.32047$         $A''_1 = -4.30158$
$A'_2 = 3.78466$          $A''_2 = 2.36050$
$A'_3 = -1.34501$         $A''_3 = -6.73486 \times 10^{-1}$
$A'_4 = 2.51944 \times 10^{-1}$    $A''_4 = 1.05232 \times 10^{-1}$
$A'_5 = -2.37123 \times 10^{-2}$   $A''_5 = -8.53634 \times 10^{-3}$
$A'_6 = 8.81836 \times 10^{-4}$    $A''_6 = 2.81049 \times 10^{-4}$ for $A_{DD} = 2.5$ D:

$A'_0 = 3.83883$          $A''_0 = 4.62363$
$A'_1 = -7.19032$         $A''_1 = -5.52815$
$A'_2 = 5.10383$          $A''_2 = 2.82720$
$A'_3 = -1.81741$         $A''_3 = -7.59493 \times 10^{-1}$
$A'_4 = 3.41628 \times 10^{-1}$    $A''_4 = 1.13108 \times 10^{-1}$
$A'_5 = -3.22755 \times 10^{-2}$   $A''_5 = -8.84934 \times 10^{-3}$
$A'_6 = 1.20462 \times 10^{-3}$    $A''_6 = 2.83891 \times 10^{-4}$ for $A_{DD} = 3$ D:

$A'_0 = 4.20262$          $A''_0 = 4.97173$
$A'_1 = -6.12634$         $A''_1 = -4.36934$
$A'_2 = 3.56706$          $A''_2 = 1.30259$
$A'_3 = -1.09381$         $A''_3 = -7.49894 \times 10^{-2}$ -continued $A'_4 = 1.84148 \times 10^{-1}$    $A''_4 = -3.14113 \times 10^{-2}$
$A'_5 = -1.60397 \times 10^{-2}$   $A''_5 = 5.74923 \times 10^{-3}$
$A'_6 = 5.63484 \times 10^{-4}$    $A''_6 = -2.84487 \times 10^{-4}$ Given the same conditions as previously, the coefficients $A_i$ of the polynomial equation for the corresponding nominal curve $P_{nom}$ then have substantially the following values:

for $A_{DD}=1.5$ D:
$A_0=2.26107$
$A_1=-3.84574$
$A_2=2.68329$
$A_3=-9.50930\times10^{-1}$
$A_4=1.78502\times10^{-1}$
$A_5=-1.68366\times10^{-2}$
$A_6=6.26637\times10^{-4}$
for $A_{DD}=2$ D:
$A_0=3.11044$
$A_1=-4.89450$
$A_2=3.08637$
$A_3=-9.92432\times10^{-1}$
$A_4=1.71515\times10^{-1}$
$A_5=-1.51366\times10^{-2}$
$A_6=5.34658\times10^{-4}$
for $A_{DD}=2.5$ D:
$A_0=4.13733$
$A_1=-6.26355$
$A_2=3.96435$
$A_3=-1.30970$
$A_4=2.34695\times10^{-1}$
$A_5=-2.15039\times10^{-2}$
$A_6=7.86718\times10^{-4}$
for $A_{DD}=3$ D:
$A0=4.61538$
$A1=-5.21075$
$A2=2.36892$
$A3=-5.47711\times10^{-1}$
$A4=6.70385\times10^{-2}$
$A5=-4.04791\times10^{-3}$
$A6=9.12504\times10^{-5}$ The values $h_1$, $h_2$, $h_3$, $h_4$ in mm are substantially as follows:

|  | $A = 1.5$ D | $A = 2$ D<br>$A = 2.5$ D<br>$A = 3$ D |
|---|---|---|
| ophthalmic lens with near vision area $Z_{VP}$ strengthened | $h_1 = 0.4$<br>$h_2 = 1$<br>$h_3 = 1.8$<br>$h_4 = 2.5$ | $h_1 = 0.4$<br>$h_2 = 1$<br>$h_3 = 1.8$<br>$h_4 = 2.2$ |
| ophthalmic lens with far vision area $Z_{VL}$ strengthened | $h_1 = 0.4$<br>$h_2 = 0.6$<br>$h_3 = 1.6$<br>$h_4 = 2$ | $h_1 = 0.4$<br>$h_2 = 0.6$<br>$h_3 = 1.4$<br>$h_4 = 1.75$ |

In accordance with the invention, at least one of a matched pair of ophthalmic lenses 10 for the same wearer, one for the left eye and the other for the right eye, has either vision area $Z_{VP}$ or $Z_{VL}$ strengthened relative to the other.

The other ophthalmic lens 10 of any such pair can be a standard ophthalmic lens 10, i.e. an ophthalmic lens whose near vision area $Z_{VP}$ and far vision area $Z_{VL}$ are equivalent, for example an ophthalmic lens of the type described in French patent application No 2 642 854, or both the ophthalmic lenses 10 can have either their near vision area $Z_{VP}$ or their far vision area $Z_{VL}$ strengthened relative to the other.

In this case, the vision area strengthened is the same for both ophthalmic lenses 10 constituting a pair, for example.

Alternatively, the vision area strengthened is the near vision area $Z_{VP}$ for one of the ophthalmic lenses 10 and the far vision area $Z_{VL}$ for the other.

Of course, the present invention is not limited to the embodiment described and shown, but encompasses any variant execution thereof.

There is claimed:

1. Simultaneous vision ophthalmic lens for correcting presbyopia wherein to define two distinct vision areas, a far vision area and a near vision area, the curve representing the proximity P as a function of the distance h from the axis lies within an area between a lower envelope curve $P_{inf}$ and an upper envelope curve $P_{sup}$ with associated specific polynomial equations in which the coefficients depend on the proximity addition corresponding to the degree of presbyopia of the wearer, and either the far vision area or the near vision area is strengthened relative to the other, the corresponding far and near vision surface areas $S_{VL}$, $S_{VP}$ being related as follows:

for strengthened near vision:

$$1.8 \leq S_{VL}/S_{VP} \leq 3.6$$

and for strengthened far vision:

$$4.75 \leq S_{VL}/S_{VP}$$

2. Ophthalmic lens according to claim 1 wherein the lower envelope curve $P_{inf}$ and the upper envelope curve $P_{sup}$ for the proximity P satisfy the following polynomial equations:

$$P_{inf} = f(h) = \sum_{i=0}^{i=6} A_i' h^{2i} + P_{VL}$$

$$P_{sup} = f(h) = \sum_{i=0}^{i=6} A_i'' h^{2i} + P_{VL}$$

in which $P_{VL}$ is the proximity needed for far vision.

3. Ophthalmic lens according to claim 2 wherein for a near vision area strengthened relative to the far vision area, the coefficients $A_i'$ and $A_i''$ have substantially the following values:

| for a proximity addition of 1.5 D: | |
|---|---|
| $A_0' = 1.50491$ | $A_0'' = 2.04007$ |
| $A_1' = -1.38224 \times 10^{-1}$ | $A_1'' = 4.87097 \times 10^{-2}$ |
| $A_2' = -8.56090 \times 10^{-1}$ | $A_2'' = -7.56137 \times 10^{-1}$ |
| $A_3' = 4.77223 \times 10^{-1}$ | $A_3'' = 3.28870 \times 10^{-1}$ |
| $A_4' = -1.07980 \times 10^{-1}$ | $A_4'' = -6.18287 \times 10^{-2}$ |
| $A_5' = 1.12726 \times 10^{-2}$ | $A_5'' = 5.58413 \times 10^{-3}$ |
| $A_6' = -4.47482 \times 10^{-4}$ | $A_6'' = -1.98243 \times 10^{-4}$ |
| for a proximity addition of 2 D: | |
| $A_0' = 2.02242$ | $A_0'' = 2.48815$ |
| $A_1' = -6.40349 \times 10^{-1}$ | $A_1'' = 1.68157 \times 10^{-1}$ |
| $A_2' = -5.33753 \times 10^{-1}$ | $A_2'' = -1.19876$ |
| $A_3' = 3.45296 \times 10^{-1}$ | $A_3'' = 5.83726 \times 10^{-1}$ |
| $A_4' = -7.89597 \times 10^{-2}$ | $A_4'' = -1.24851 \times 10^{-1}$ |
| $A_5' = 8.16828 \times 10^{-3}$ | $A_5'' = 1.27178 \times 10^{-2}$ |
| $A_6' = -3.20478 \times 10^{-4}$ | $A_6'' = -5.00502 \times 10^{-4}$ |
| for a proximity addition of 2.5 D: | |
| $A_0' = 2.48274$ | $A_0'' = 2.97168$ |
| $A_1' = -8.68865 \times 10^{-1}$ | $A_1'' = -2.69412 \times 10^{-1}$ |
| $A_2' = -3.88790 \times 10^{-1}$ | $A_2'' = -8.19247 \times 10^{-1}$ |
| $A_3' = 2.79778 \times 10^{-1}$ | $A_3'' = 4.23097 \times 10^{-1}$ |
| $A_4' = -6.48836 \times 10^{-2}$ | $A_4'' = -9.28940 \times 10^{-2}$ |
| $A_5' = 6.77817 \times 10^{-3}$ | $A_5'' = 9.73358 \times 10^{-3}$ |
| $A_6' = -2.68852 \times 10^{-4}$ | $A_6'' = -3.94207 \times 10^{-4}$ |
| for a proximity addition of 3 D: | |
| $A_0' = 3.20707$ | $A_0'' = 3.72727$ |
| $A_1' = -1.13298$ | $A_1'' = -5.24234 \times 10^{-1}$ |
| $A_2' = -3.09307 \times 10^{-1}$ | $A_2'' = -7.92418 \times 10^{-1}$ |
| $A_3' = 2.18484 \times 10^{-1}$ | $A_3'' = 4.14478 \times 10^{-1}$ |
| $A_4' = -4.43817 \times 10^{-2}$ | $A_4'' = -8.98178 \times 10^{-2}$ |
| $A_5' = 4.04925 \times 10^{-3}$ | $A_5'' = 9.32974 \times 10^{-3}$ |
| $A_6' = -1.42370 \times 10^{-4}$ | $A_6'' = -3.76612 \times 10^{-4}$. |

4. Ophthalmic lens according to claim 3 wherein the nominal curve $P_{nom}$ representing the nominal proximity substantially satisfies the following equation:

$$P_{nom} = f(h) = \sum_{i=0}^{i=6} A_i h^{2i} + P_{VL}$$

with the following coefficient values, subject to the same conditions as previously:

for a proximity addition of 1.5 D:

$A_0 = 1.74537$ $A_1 = -1.41485 \times 10^{-2}$ $A_2 = -7.74395 \times 10^{-1}$ $A_3 = 3.78836 \times 10^{-1}$ $A_4 = -7.92805 \times 10^{-2}$ $A_5 = 7.88011 \times 10^{-3}$ $A_6 = -3.03496 \times 10^{-4}$ for a proximity addition of 2 D:

$A_0 = 2.25360$ $A_1 = -9.83461 \times 10^{-2}$ $A_2 = -1.05467$ $A_3 = 5.47912 \times 10^{-1}$ $A_4 = -1.18670 \times 10^{-1}$ $A_5 = 1.20372 \times 10^{-2}$ $A_6 = -4.68919 \times 10^{-4}$ for a proximity addition of 2.5 D:

$A_0 = 2.72749$ $A_1 = -2.39063 \times 10^{-1}$ $A_2 = -9.80544 \times 10^{-1}$ $A_3 = 5.14985 \times 10^{-1}$ $A_4 = -1.13158 \times 10^{-1}$ $A_5 = 1.17328 \times 10^{-2}$ $A_6 = -4.68365 \times 10^{-4}$ for a proximity addition of 3 D:

$A_0 = 3.47334$ $A_1 = -9.73082 \times 10^{-1}$ $A_2 = -2.97809 \times 10^{-1}$ $A_3 = 1.70028 \times 10^{-1}$ $A_4 = -3.05735 \times 10^{-2}$ $A_5 = 2.58076 \times 10^{-3}$ $A_6 = -8.78906 \times 10^{-5}$ 5. Ophthalmic lens according to claim 2 wherein for a far vision area strengthened relative to the near vision area the coefficients $A_i'$ and $A_i''$ have substantially the following values:

for a proximity addition of 1.5 D:

| | |
|---|---|
| $A'_0 = 1.97385$ | $A''_0 = 2.61695$ |
| $A'_1 = -4.02882$ | $A''_1 = -3.55654$ |
| $A'_2 = 2.96745$ | $A''_2 = 2.28086$ |
| $A'_3 = -1.08765$ | $A''_3 = -7.81238 \times 10^{-1}$ |
| $A'_4 = 2.08906 \times 10^{-1}$ | $A''_4 = 1.46046 \times 10^{-1}$ |
| $A'_5 = -2.00552 \times 10^{-2}$ | $A''_5 = -1.39278 \times 10^{-2}$ |
| $A'_6 = 7.57585 \times 10^{-4}$ | $A''_6 = 5.27592 \times 10^{-4}$ | for a proximity addition of 2 D:

| | |
|---|---|
| $A'_0 = 2.75706$ | $A''_0 = 3.39285$ |
| $A'_1 = -5.32047$ | $A''_1 = -4.30158$ |
| $A'_2 = 3.78466$ | $A''_2 = 2.36050$ |
| $A'_3 = -1.34501$ | $A''_3 = -6.73486 \times 10^{-1}$ |
| $A'_4 = 2.51944 \times 10^{-1}$ | $A''_4 = 1.05232 \times 10^{-1}$ |
| $A'_5 = -2.37123 \times 10^{-2}$ | $A''_5 = -8.53634 \times 10^{-3}$ |
| $A'_6 = 8.81836 \times 10^{-4}$ | $A''_6 = 2.81049 \times 10^{-4}$ | for a proximity addition of 2.5 D:

| | |
|---|---|
| $A'_0 = 3.83883$ | $A''_0 = 4.62363$ |
| $A'_1 = -7.19032$ | $A''_1 = -5.52815$ |
| $A'_2 = 5.10383$ | $A''_2 = 2.82720$ |
| $A'_3 = -1.81741$ | $A''_3 = -7.59493 \times 10^{-1}$ |
| $A'_4 = 3.41628 \times 10^{-1}$ | $A''_4 = 1.13108 \times 10^{-1}$ |
| $A'_5 = -3.22755 \times 10^{-2}$ | $A''_5 = -8.84934 \times 10^{-3}$ |
| $A'_6 = 1.20462 \times 10^{-3}$ | $A''_6 = 2.83891 \times 10^{-4}$ | for a proximity addition of 3 D:

| | |
|---|---|
| $A'_0 = 4.20262$ | $A''_0 = 4.97173$ |
| $A'_1 = -6.12634$ | $A''_1 = -4.36934$ |
| $A'_2 = 3.56706$ | $A''_2 = 1.30259$ |
| $A'_3 = -1.09381$ | $A''_3 = -7.49894 \times 10^{-2}$ |
| $A'_4 = 1.84148 \times 10^{-1}$ | $A''_4 = -3.14113 \times 10^{-2}$ |
| $A'_5 = -1.60397 \times 10^{-2}$ | $A''_5 = 5.74923 \times 10^{-3}$ |
| $A'_6 = 5.63484 \times 10^{-4}$ | $A''_6 = -2.84487 \times 10^{-4}$ |

6. Ophthalmic lens according to claim 5 wherein the curve $P_{nom}$ representing its nominal proximity substantially satisfies the equation:

$$P_{nom} = f(h) = \sum_{i=0}^{i=6} A_i h^{2i} + P_{VL}$$

with the coefficients having the following values given the same conditions as previously:

for a proximity addition of 1.5 D:
$A_0 = 2.26107$
$A_1 = -3.84574$
$A_2 = 2.68329$
$A_3 = -9.50930 \times 10^{-1}$
$A_4 = 1.78502 \times 10^{-1}$
$A_5 = -1.68366 \times 10^{-2}$
$A_6 = 6.26637 \times 10^{-4}$ for a proximity addition of 2 D:
$A_0 = 3.11044$
$A_1 = -4.89450$
$A_2 = 3.08637$
$A_3 = -9.92432 \times 10^{-1}$
$A_4 = 1.71515 \times 10^{-1}$
$A_5 = -1.51366 \times 10^{-2}$
$A_6 = 5.34658 \times 10^{-4}$ for a proximity addition of 2.5 D:
$A_0 = 4.13733$
$A_1 = -6.26355$
$A_2 = 3.96435$
$A_3 = -1.30970$
$A_4 = 2.34695 \times 10^{-1}$
$A_5 = -2.15039 \times 10^{-2}$
$A_6 = 7.86718 \times 10^{-4}$ for a proximity addition of 3 D:
$A_0 = 4.61538$
$A_1 = -5.21075$
$A_2 = 2.36892$
$A_3 = -5.47711 \times 10^{-1}$
$A_4 = 6.70385 \times 10^{-2}$
$A_5 = -4.04791 \times 10^{-3}$
$A_6 = 9.12504 \times 10^{-5}$

7. Pair of matched ophthalmic lenses for the same wearer, one for correcting the vision of the left eye and the other for correcting the vision of the right eye, wherein at least one of said ophthalmic lens is a simultaneous vision ophthalmic lens for correcting presbyopia wherein to define two distinct vision areas, a far vision area and a near vision area, the curve representing the proximity P as a function of the distance h from the axis lies within an area between a lower envelope curve $P_{inf}$ and an upper envelope curve $P_{sup}$ with associated specific polynomial equations in which the coefficients depend on the proximity addition corresponding to the degree of presbyopia of the wearer, and either the far vision area or the near vision area is strengthened relative to the other, the corresponding far and near vision surface areas $S_{VL}$, $S_{VP}$ being related as follows:

for strengthened near vision:

$$1.8 \leq S_{VL}/S_{VP} \leq 3.6$$

and for strengthened far vision:

$$4.75 \leq S_{VL}/S_{VP}$$

8. Pair of ophthalmic lenses according to claim 7 wherein the other ophthalmic lens is a standard ophthalmic lens with equivalent near and far vision areas.

9. Pair of ophthalmic lenses according to claim 7 wherein the strengthened vision area is the same for both ophthalmic lenses.

10. Pair of ophthalmic lenses according to claim 7 wherein the strengthened vision area is the near vision area for one lens and the far vision area for the other lens.

11. Pair of ophthalmic lenses according to claim 7 wherein the lower envelope curve $P_{inf}$ and the upper envelope curve $P_{sup}$ for the proximity P satisfy the following polynomial equations:

$$P_{inf} = f(h) = \sum_{i=0}^{i=6} A_i' h^{2i} + P_{VL}$$

$$P_{sup} = f(h) = \sum_{i=0}^{i=6} A_i'' h^{2i} + P_{VL}$$

in which $P_{VL}$ is the proximity needed for far vision.

12. Pair of ophthalmic lenses according to claim 11 wherein for a near vision area strengthened relative to the far vision area, the coefficients $A'_i$ and $A''_i$ have substantially the following values:

for a proximity addition of 1.5 D:

| | |
|---|---|
| $A'_0 = 1.50491$ | $A''_0 = 2.04007$ |
| $A'_1 = -1.38224 \times 10^{-1}$ | $A''_1 = 4.87097 \times 10^{-2}$ |

-continued $A'_2 = -8.56090 \times 10^{-1}$        $A''_2 = -7.56137 \times 10^{-1}$
$A'_3 = 4.77223 \times 10^{-1}$         $A''_3 = 3.28870 \times 10^{-1}$
$A'_4 = -1.07980 \times 10^{-1}$        $A''_4 = -6.18287 \times 10^{-2}$
$A'_5 = 1.12726 \times 10^{-2}$         $A''_5 = 5.58413 \times 10^{-3}$
$A'_6 = -4.47482 \times 10^{-4}$        $A''_6 = -1.98243 \times 10^{-4}$ for a proximity addition of 2 D:

$A'_0 = 2.02242$                        $A''_0 = 2.48815$
$A'_1 = -6.40349 \times 10^{-1}$        $A''_1 = 1.68157 \times 10^{-1}$
$A'_2 = -5.33753 \times 10^{-1}$        $A''_2 = -1.19876$
$A'_3 = 3.45296 \times 10^{-1}$         $A''_3 = 5.83726 \times 10^{-1}$
$A'_4 = -7.89597 \times 10^{-2}$        $A''_4 = -1.24851 \times 10^{-1}$
$A'_5 = 8.16828 \times 10^{-3}$         $A''_5 = 1.27178 \times 10^{-2}$
$A'_6 = -3.20478 \times 10^{-4}$        $A''_6 = -5.00502 \times 10^{-4}$ for a proximity addition of 2.5 D:

$A'_0 = 2.48274$                        $A''_0 = 2.97168$
$A'_1 = -8.68865 \times 10^{-1}$        $A''_1 = -2.69412 \times 10^{-1}$
$A'_2 = -3.88790 \times 10^{-1}$        $A''_2 = -8.19247 \times 10^{-1}$
$A'_3 = 2.79778 \times 10^{-1}$         $A''_3 = 4.23097 \times 10^{-1}$
$A'_4 = -6.48836 \times 10^{-2}$        $A''_4 = -9.28940 \times 10^{-2}$
$A'_5 = 6.77817 \times 10^{-3}$         $A''_5 = 9.73358 \times 10^{-3}$
$A'_6 = -2.68852 \times 10^{-4}$        $A''_6 = -3.94207 \times 10^{-4}$ for a proximity addition of 3 D:

$A'_0 = 3.20707$                        $A''_0 = 3.72727$
$A'_1 = -1.13298$                       $A''_1 = -5.24234 \times 10^{-1}$
$A'_2 = -3.09307 \times 10^{-1}$        $A''_2 = -7.92418 \times 10^{-1}$
$A'_3 = 2.18484 \times 10^{-1}$         $A''_3 = 4.14478 \times 10^{-1}$
$A'_4 = -4.43817 \times 10^{-2}$        $A''_4 = -8.98178 \times 10^{-2}$
$A'_5 = 4.04925 \times 10^{-3}$         $A''_5 = 9.32974 \times 10^{-3}$
$A'_6 = -1.42370 \times 10^{-4}$        $A''_6 = -3.76612 \times 10^{-4}$.

13. Pair of ophthalmic lens according to claim 12 wherein the nominal curve $P_{nom}$ representing the nominal proximity substantially satisfies the following equation:

$$P_{nom} = f(h) = \sum_{i=0}^{i=6} A_i h^{2i} + P_{VL}$$

with the following coefficient values, subject to the same conditions as previously:

for a proximity addition of 1.5 D:
$A_0 = 1.74537$
$A_1 = -1.41485 \times 10^{-2}$
$A_2 = -7.74395 \times 10^{-1}$
$A_3 = 3.78836 \times 10^{-1}$
$A_4 = -7.92805 \times 10^{-2}$
$A_5 = 7.88011 \times 10^{-3}$
$A_6 = -3.03496 \times 10^{-4}$ for a proximity addition of 2 D:
$A_0 = 2.25360$
$A_1 = -9.83461 \times 10^{-2}$
$A_2 = -1.05467$
$A_3 = 5.47912 \times 10^{-1}$
$A_4 = -1.18670 \times 10^{-1}$
$A_5 = 1.20372 \times 10^{-2}$
$A_6 = -4.68919 \times 10^{-4}$ for a proximity addition of 2.5 D:
$A_0 = 2.72749$
$A_1 = -2.39063 \times 10^{-1}$
$A_2 = -9.80544 \times 10^{-1}$
$A_3 = 5.14985 \times 10^{-1}$
$A_4 = -1.13158 \times 10^{-1}$
$A_5 = 1.17328 \times 10^{-2}$
$A_6 = -4.68365 \times 10^{-4}$ for a proximity addition of 3 D:
$A_0 = 3.47334$
$A_1 = -9.73082 \times 10^{-1}$
$A_2 = -2.97809 \times 10^{-1}$
$A_3 = 1.70028 \times 10^{-1}$
$A_4 = -3.05735 \times 10^{-2}$
$A_5 = 2.58076 \times 10^{-3}$
$A_6 = -8.78906 \times 10^{-5}$ 14. Pair of ophthalmic lens according to claim 11 wherein for a far vision area strengthened relative to the near vision area the coefficients $A'_i$ and $A''_i$ have substantially the following values:

for a proximity addition of 1.5 D:

$A'_0 = 1.97385$                        $A''_0 = 2.61695$
$A'_1 = -4.02882$                       $A''_1 = -3.55654$
$A'_2 = 2.96745$                        $A''_2 = 2.28086$
$A'_3 = -1.08765$                       $A''_3 = -7.81238 \times 10^{-1}$
$A'_4 = 2.08906 \times 10^{-1}$         $A''_4 = 1.46046 \times 10^{-1}$
$A'_5 = -2.00552 \times 10^{-2}$        $A''_5 = -1.39278 \times 10^{-2}$
$A'_6 = 7.57585 \times 10^{-4}$         $A''_6 = 5.27592 \times 10^{-4}$ for a proximity addition of 2 D:

$A'_0 = 2.75706$                        $A''_0 = 3.39285$
$A'_1 = -5.32047$                       $A''_1 = -4.30158$
$A'_2 = 3.78466$                        $A''_2 = 2.36050$
$A'_3 = -1.34501$                       $A''_3 = -6.73486 \times 10^{-1}$
$A'_4 = 2.51944 \times 10^{-1}$         $A''_4 = 1.05232 \times 10^{-1}$
$A'_5 = -2.37123 \times 10^{-2}$        $A''_5 = -8.53634 \times 10^{-3}$
$A'_6 = 8.81836 \times 10^{-4}$         $A''_6 = 2.81049 \times 10^{-4}$ for a proximity addition of 2.5 D:

$A'_0 = 3.83883$                        $A''_0 = 4.62363$
$A'_1 = -7.19032$                       $A''_1 = -5.52815$
$A'_2 = 5.10383$                        $A''_2 = 2.82720$
$A'_3 = -1.81741$                       $A''_3 = -7.59493 \times 10^{-1}$
$A'_4 = 3.41628 \times 10^{-1}$         $A''_4 = 1.13108 \times 10^{-1}$
$A'_5 = -3.22755 \times 10^{-2}$        $A''_5 = -8.84934 \times 10^{-3}$
$A'_6 = 1.20462 \times 10^{-3}$         $A''_6 = 2.83891 \times 10^{-4}$ for a proximity addition of 3 D:

$A'_0 = 4.20262$                        $A''_0 = 4.97173$
$A'_1 = -6.12634$                       $A''_1 = -4.36934$
$A'_2 = 3.56706$                        $A''_2 = 1.30259$
$A'_3 = -1.09381$                       $A''_3 = -7.49894 \times 10^{-2}$
$A'_4 = 1.84148 \times 10^{-1}$         $A''_4 = -3.14113 \times 10^{-2}$
$A'_5 = -1.60397 \times 10^{-2}$        $A''_5 = 5.74923 \times 10^{-3}$
$A'_6 = 5.63484 \times 10^{-4}$         $A''_6 = -2.84487 \times 10^{-4}$.

15. Pair of ophthalmic lens according to claim 14 wherein the curve $P_{nom}$ representing its nominal proximity substantially satisfies the equation:

$$P_{nom} = f(h) = \sum_{i=0}^{i=6} A_i h^{2i} + P_{VL}$$

with the coefficients having the following values given the same conditions as previously:

for a proximity addition of 1.5 D:
$A_0 = 2.26107$
$A_1 = -3.84574$
$A_2 = 2.68329$
$A_3 = -9.50930 \times 10^{-1}$
$A_4 = 1.78502 \times 10^{-1}$
$A_5 = -1.68366 \times 10^{-2}$
$A_6 = 6.26637 \times 10^{-4}$ for a proximity addition of 2 D:
$A_0 = 3.11044$
$A_1 = -4.89450$
$A_2 = 3.08637$ $A_3=-9.92432\times10^{-1}$
$A_4=1.71515\times10^{-1}$
$A_5=-1.51366\times10^{-2}$
$A_6=5.34658\times10^{-4}$
for a proximity addition of 2.5 D:
$A_0=4.13733$
$A_1=-6.26355$
$A_2=3.96435$
$A_3=-1.30970$
$A_4=2.34695\times10^{-1}$
$A_5=-2.15039\times10^{-2}$
$A_6=7.86718\times10^{-4}$
for a proximity addition of 3 D:
$A_0=4.61538$
$A_1=-5.21075$
$A_2=2.36892$
$A_3=-5.47711\times10^{-1}$
$A_4=6.70385\times10^{-2}$
$A_5=-4.04791\times10^{-3}$
$A_6=9.12504\times10^{-5}$

* * * * *